Jan. 13, 1925.

J. W. FITZ GERALD 1,523,112

REFRIGERATING APPARATUS

Filed May 31, 1924

INVENTOR.
John W. Fitzgerald.
BY Stuart C. Barnes
ATTORNEY.

Patented Jan. 13, 1925.

1,523,112

UNITED STATES PATENT OFFICE.

JOHN W. FITZ GERALD, OF DETROIT, MICHIGAN, ASSIGNOR OF ONE-HALF TO FRANK KANTER, OF DETROIT, MICHIGAN.

REFRIGERATING APPARATUS.

Application filed May 31, 1924. Serial No. 716,961.

*To all whom it may concern:*

Be it known that I, JOHN W. FITZ GERALD, a citizen of the United States, residing at Detroit, in the county of Wayne and State of Michigan, have invented certain new and useful Improvements in Refrigerating Apparatus, of which the following is a specification.

This invention relates to refrigerating systems especially a refrigerating system such as is used in soda counters. However, this installation is capable of a broader application and can be used where there are several units that are to be kept in a chilled condition, especially, where it is desirable to keep these units at different temperatures.

In using a mechanical and electrical refrigerating unit in connection with soda counters it is found desirable to have two compartments from which heat is abstracted; one compartment is kept at a relatively low temperature—say at zero. This is intended to receive ice-cream, ices, etc.; the other compartment is intended for storage of various beverages and possibly for the refrigerating of the water and the soda water. This compartment must be kept above the freezing point.

It has been customary to utilize the expansion of gas for effecting the heat exchange and circulating brine has been employed in each compartment as a medium for immediately effecting the heat exchange. Separate thermostats have been used in each compartment. The thermostat in the colder compartment has been used to control the motor that operated the compressor. The thermostat in the warmer compartment has been used to control the motor which operates a pump that pumps the colder brine from the colder compartment into the brine tank and the warmer compartment. This apparatus has achieved its purpose but is relatively expensive as it really involves two separate units in the installation, resulting in considerable extra cost in installation and larger service cost and liability to disorder.

Referring to the drawings.

Figure 1:
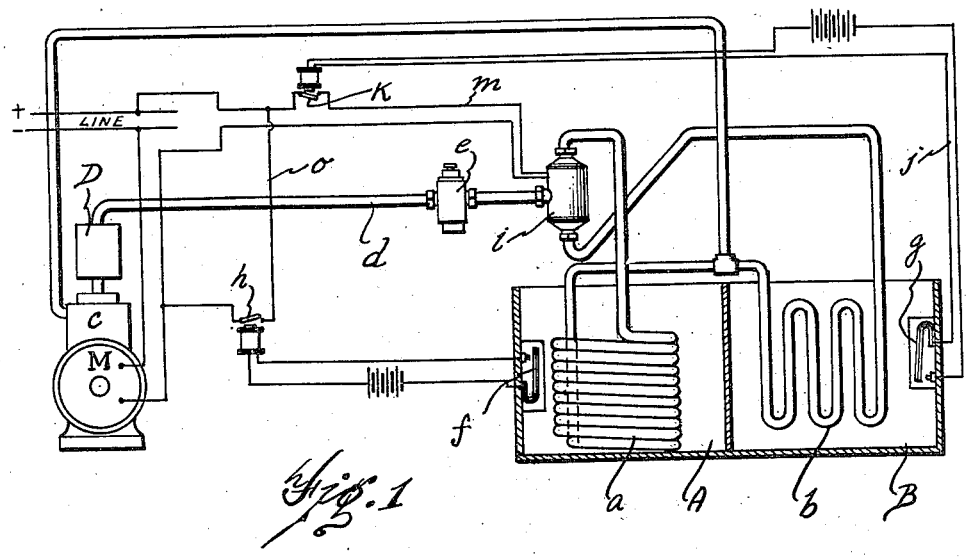
Fig. 1 is a diagrammatic view of the installation.

Referring to Fig. 1, the parts are only shown diagrammatically. A indicates the colder compartment; B the warmer compartment. Only the brine tanks here need be shown. It will be obvious any suitable arrangement for the reception of the ice-cream, ices and beverages can be adopted and any suitable jacketing system for securing the heat exchange and the circulation of the brine may be employed. $a$ represents the expansion coil in the colder chamber; $b$ the expansion coil in the warmer chamber. M designates an electric motor which controls a compressor C; D represents the condenser. In the familiar way, the gases are drawn into the compressor and compressed to a high pressure; they then pass through the condenser where they are liquefied; then through the conductor $d$ to the expansion valve $e$. They then pass through a suitable conduit to the expansion coil and then return through a suitable conduit to the compressor. This is the ordinary expansion type of refrigerating unit.

A thermostat is designated $f$ and is located in the colder chamber A. This controls an electric switch $h$, which in turn controls the electric motor, hence when the temperature in the colder chamber rises above a given point the thermostat will switch on the motor and start the compressor and the gas will be caused to be compressed and liquefied and released through the expansion valve, thereby abstracting heat from the compartment A. This much of the apparatus is old.

The thermostat $g$ in compartment B is set to close a switch at a point somewhat above the freezing point. However, as already explained, it has been customary to have this thermostat governing the inlet of the colder brine from the colder compartment A. This requires extra operating apparatus, such as a motor and pump. My improvement consists in the arrangement which permits the thermostat $g$ to control the motor and compressor and which controls the distribution of the refrigerating gas and liquid.

This is effected by the use of a special electro-magnetically controlled gas distributing valve designated $i$. It will be seen that the thermostat $g$ is part of a circuit $j$ which controls a switch $k$. This switch $k$ is in the electric circuit $m$ which enters the valve housing *i* and forms a winding *n* of the electric magnet. This circuit *m*, as will be seen from the diagrammatic view, connects up with the line wires and also passes through the motor. Similarly, the circuit designated *o* includes the switch *h* and passes through the electric motor and connects up with the line wires.

The distributing valve *i* is shown in the position it takes when the magnet is energized. The valve element *q* is shown engaging against the seat *r*. When the valve is open the gas coming through the opening *s* from the expansion valve is allowed to pass into the passageway *t* and thence into the expansion coil *a* of the colder compartment. However, the circulation will only be affected when the thermostat *f* is closed and the motor is energized to operate the compressor.

Figures 2, 3:
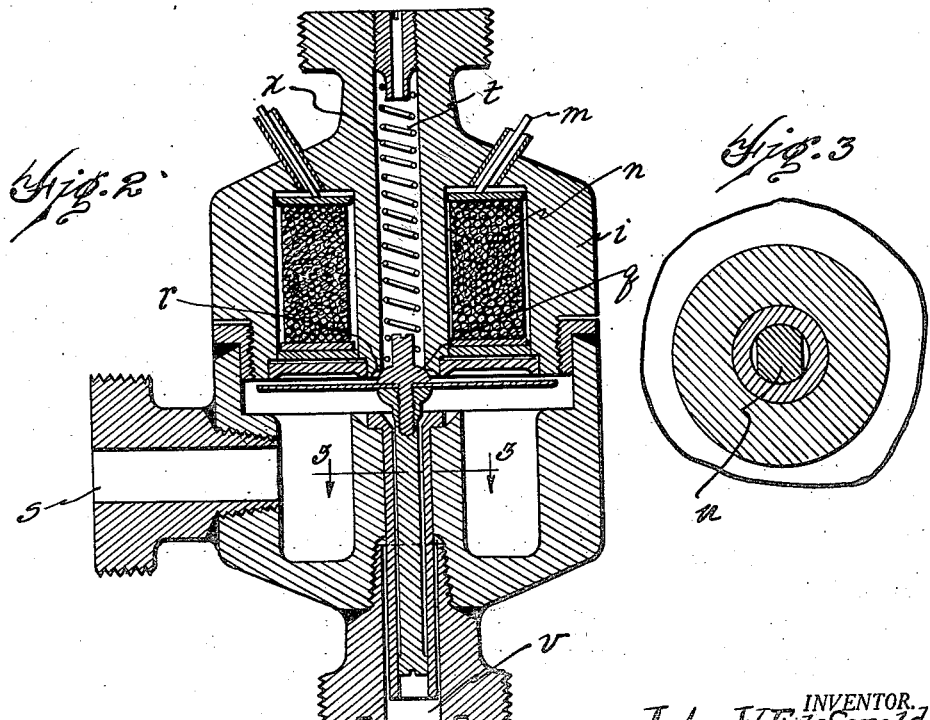
Fig. 2 is a longitudinal section through the special control valve.
Fig. 3 is a section on the line 3—3 of Fig. 2.

When the thermostat *g* closes the electric circuit through the circuit *j* this closes the switch *k* in the circuit *m*. This energizes the electric magnet and shifts the valve element *q* to the upper position shown in Fig. 2. In this position the gas enters the distributing valve through the passageway *s;* then passes down along the flatted stem *u* and out the passageway *v* to the coil *b* of the compartment B. At the same time it will be seen that the circuit *m* is coupled up with the motor and the line wires so as to start the compressor.

In case both thermostats close their respective switches at the same time, the circuit *o* will practically short-circuit the winding of the electric magnet so that this magnet will not get enough current to overcome the pressure of the spring *x*. Consequently, when both thermostats are stimulated at the same time, the distribution is made only to the colder chamber, but as soon as the temperature here falls to the desired point this circuit cuts off and permits the other circuit to have enough current to energize the magnet and direct the gas into the warmer compartment B.

What I claim is:

1. In a refrigerating system, the combination of a plurality of units requiring heat exchange, a heat abstracting system working on the expansion plan and connected with each unit, a distributing valve in such connection, and automatic means associated with each unit for starting in operation the heat abstracting system and for simultaneously operating the distributing valve to direct the gases into the proper unit requiring heat exchange.

2. In a refrigerating system, the combination of a plurality of units requiring heat exchange, electro-mechanically operating means for abstracting heat on the expansion principle, a plurality of thermostats for automatically controlling such means, one in connection with each unit requiring heat exchange, and electro-magnetically controlled distributing valve connected with said thermostats for governing the distribution of the gas from such heat abstracting means to the proper unit requiring heat exchange.

3. In a refrigerating system, the combination of a plurality of units requiring heat exchange, means for abstracting heat including a circulating medium, a distributing valve controlling the units to which such circulating medium is distributed, an automatic means associated with each unit for starting in operation the heat abstracting means and for simultaneously operating the distributing valve to direct the circulating medium into the proper unit requiring heat exchange.

In testimony whereof he has affixed his signature.

JOHN W. FITZ GERALD.